United States Patent
Armstrong et al.

(10) Patent No.: US 10,949,508 B2
(45) Date of Patent: Mar. 16, 2021

(54) SYSTEM AND METHOD TO PROTECT ORIGINAL MUSIC FROM UNAUTHORIZED REPRODUCTION AND USE

(71) Applicant: Productionpal LLC, Monticello, MN (US)

(72) Inventors: Wayne T. Armstrong, Monticello, MN (US); Jamie M. Boxell, Placitas, NM (US); Robert D Battis, Skillman, NJ (US); James B. Boggs, Burlington, NC (US); Perry M. Fonseca, Lawrenceville, NJ (US)

(73) Assignee: PRODUCTIONPAL, LLC, Monticello, MN (US)

( * ) Notice: Subject to any disclaimer, the term of this patent is extended or adjusted under 35 U.S.C. 154(b) by 69 days.

(21) Appl. No.: 16/101,424

(22) Filed: Aug. 11, 2018

(65) Prior Publication Data
US 2019/0050542 A1  Feb. 14, 2019

Related U.S. Application Data

(60) Provisional application No. 62/544,015, filed on Aug. 11, 2017.

(51) Int. Cl.
| | |
|---|---|
| *G06F 21/00* | (2013.01) |
| *G06F 21/16* | (2013.01) |
| *G06F 21/34* | (2013.01) |
| *G06F 21/62* | (2013.01) |
| *H04W 4/80* | (2018.01) |
| *G06F 21/10* | (2013.01) |

(52) U.S. Cl.
CPC .............. *G06F 21/16* (2013.01); *G06F 21/10* (2013.01); *G06F 21/34* (2013.01); *G06F 21/6218* (2013.01); *H04W 4/80* (2018.02)

(58) Field of Classification Search
CPC ...... G06F 21/16; G06F 21/34; G06F 21/6218; G06F 21/10; H04W 4/80
See application file for complete search history.

(56) References Cited

U.S. PATENT DOCUMENTS

| | | | |
|---|---|---|---|
| 8,090,130 B2 * | 1/2012 | Zorkendorfer | G06F 1/1643 381/334 |
| 10,262,356 B2 * | 4/2019 | Davis | G06Q 30/0639 |
| 2002/0186842 A1 * | 12/2002 | Sabet-Sharghi | G11B 20/00094 380/200 |
| 2004/0261112 A1 * | 12/2004 | Hicks, III | H04N 21/8352 725/89 |
| 2006/0153409 A1 * | 7/2006 | Yeh | H04R 5/0335 381/333 |
| 2007/0100756 A1 * | 5/2007 | Varma | G06F 21/10 705/51 |
| 2009/0279722 A1 * | 11/2009 | Lin | H04R 5/04 381/311 |
| 2010/0054519 A1 * | 3/2010 | Mulvey | G06F 1/1632 381/386 |

(Continued)

*Primary Examiner* — Don G Zhao
(74) *Attorney, Agent, or Firm* — Patterson Thuente Pedersen, P.A.

(57) ABSTRACT

Provided is a new digital music storage and readout system and method that incorporates layers of anti-pirating features to inhibit unauthorized reproduction of device music content. This concept and device design may be extended to video storage and playback.

20 Claims, 6 Drawing Sheets

Optional BMP3 Package with Touch Screen LCD Display

(56) References Cited

U.S. PATENT DOCUMENTS

| | | | |
|---|---|---|---|
| 2010/0329638 A1* | 12/2010 | Soukup | H04N 21/8106 386/252 |
| 2011/0235313 A1* | 9/2011 | Canella | F21V 29/507 362/157 |
| 2013/0189925 A1* | 7/2013 | Staskawicz | H04W 4/50 455/41.1 |
| 2014/0267002 A1* | 9/2014 | Luna | H04W 4/80 345/156 |
| 2014/0279546 A1* | 9/2014 | Poole | G06Q 20/3227 705/44 |
| 2015/0238070 A1* | 8/2015 | Lia | A61B 1/31 600/223 |
| 2015/0278980 A1* | 10/2015 | Sinclair | G06T 1/0064 382/100 |
| 2015/0371529 A1* | 12/2015 | Dolecki | H04S 7/302 700/94 |
| 2016/0170706 A1* | 6/2016 | Woo | G06F 3/165 700/94 |
| 2016/0255457 A1* | 9/2016 | Ishida | H04W 4/60 340/4.37 |
| 2017/0105096 A1* | 4/2017 | Olson | H04W 4/023 |
| 2017/0124303 A1* | 5/2017 | Baldwin | H04L 67/42 |
| 2017/0171699 A1* | 6/2017 | Jin | H04B 17/318 |
| 2017/0213533 A1* | 7/2017 | Hiroi | G10H 1/0066 |
| 2017/0286933 A1* | 10/2017 | Medeiros, III | G06F 21/10 |
| 2017/0289605 A1* | 10/2017 | Greig | H04N 21/414 |
| 2018/0115812 A1* | 4/2018 | Lee | H04R 1/026 |
| 2018/0234768 A1* | 8/2018 | Kong | H04R 1/023 |
| 2019/0058948 A1* | 2/2019 | Gupta | G10L 25/60 |
| 2019/0081426 A1* | 3/2019 | Chavakula | H01R 27/00 |
| 2019/0090302 A1* | 3/2019 | Lin | H04W 4/80 |
| 2019/0258449 A1* | 8/2019 | Mudaliar | G11B 27/102 |
| 2020/0159374 A1* | 5/2020 | Yang | H04M 1/72527 |

\* cited by examiner

INVENTION TO PROTECT ORIGINAL MUSIC FROM UNAUTHORIZED REPRODUCTION AND USE

Figure 1: Typical BMP3 Packaging concept compared to a Cell Phone and old Floppy Disk Figure 2: Optional BMP3 Package with Touch Screen LCD Display Figure 3: BMP3 Electronic Block Diagram Figure 4: BMP3 System Use Figure 5: Flow Chart Illustrating User Operation of a basic BMP3

Figure 6: Flow Chart Illustrating User Operation of a BMP3 with LCD screen

SYSTEM AND METHOD TO PROTECT ORIGINAL MUSIC FROM UNAUTHORIZED REPRODUCTION AND USE

CROSS-REFERENCE TO RELATED APPLICATIONS

This application claims priority from U.S. Provisional Patent Application No. 62/544,015 filed on Aug. 11, 2017, by Boxell, et al. titled "Invention to Protect Original Music from Unauthorized Reproduction and Use," which is incorporated herein by reference in its entirety.

FIELD OF THE INVENTION

This invention presents a new concept and method of packaging commercial music which will inhibit unauthorized reproduction or pirating of the commercial or original music. An extension of this concept and method of packaging can be applied to original videos.

BACKGROUND OF THE INVENTION

Presently, artists (musicians and singers) and producers sell their music creations commercially using the medium of CDs and by authorized digital downloading from the internet or via a personal cell phone. Through these sales the artists and producers earn their income as a reward for their creative efforts. Unfortunately unauthorized reproductions or pirating of this music can be easily done by "ripping" the music from the CD or copying the digital downloads or by file-sharing between individuals. These unauthorized reproductions or pirating of this music deprives the artists and producers of their income. Further, this practice is unfair as well as discouraging artists and producers from investing time and money in creating high-quality music. A CNN/Money report of Jun. 24, 2005 reported that the "global black market for stolen music discs reached $4.6 billion last year—or one in three CDs." See, http://money.cnn.com/2005/06/24/news/international/music_piracy/. An eWEEK report of May 5, 2011 reported that "software piracy jumped 14 percent worldwide, costing software companies about $59 billion, according to the Business Software Alliance." See, http://www.eweek.com/c/a/Security/Software-Piracy-Costs-59-Bn-in-Lost-Revenue-May-Be-Even-Higher-Survey-272553. Revenue losses through pirating will only increase with time.

Unauthorized reproduction or pirating of music may also occur from other technologies such as older audio magnetic tape cassettes, video cassettes, real-to-real magnetic tapes and the newer thumb drives or high capacity digital memory devices.

As a result of the rampant unauthorized reproduction or pirating of this original music a method must be found that inhibits this practice while not inhibiting the commercial sales of this original music. This invention provides a solution to this problem as well as expanding market opportunities to increase music sales.

SUMMARY OF THE INVENTION

As a result of the reduction in feature size and cost of digital storage which has recently been quoted at less than 30¢ per GB, see https://www.pny.com/mega-consumer/shop-all-products/usb-flash-drives, and considering over 300 songs may be stored in a 1 GB, music tracks may be digitally stored for less than 10 per track. This leads to the concept of replacing the CD which is based on optical storage with a new device based on digital storage and packaging the digital chips in such a way that inhibits unauthorized reproduction or pirating of the device content. The digital storage capacity of the digital chip set may be easily scaled using conventional industry practice to accommodate any reasonably desired number of music tracks.

A preferred embodiment of the present invention packages the digital storage chip set with battery in a small sealed block of suitable plastic having no external electronic connections by which to access the digital storage media. This new device shall be referred to as the BMP3 module, or simply BMP3.

This preferred embodiment of the BMP3 invention outputs stored music content by way of a Ghz signal by implementing a Bluetooth filter or non-standard version of the industry's Bluetooth communication protocol or proprietary firmware. Using this non-standard Bluetooth communication method, with special BMP3 control software prevents unauthorized reproduction or pirating of the digital content contained in the BMP3's chip set.

In summary, the preferred embodiment of the BMP3 provides unlimited storage of musical tracks compared to a CD and unlike a CD which offers no anti-pirating capability the BMP3 has multi-layers of anti-pirating features.

DETAILED DESCRIPTION

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in an embodiment" in various places in the specification are not necessarily all referring to the same embodiment.

Figure 1:
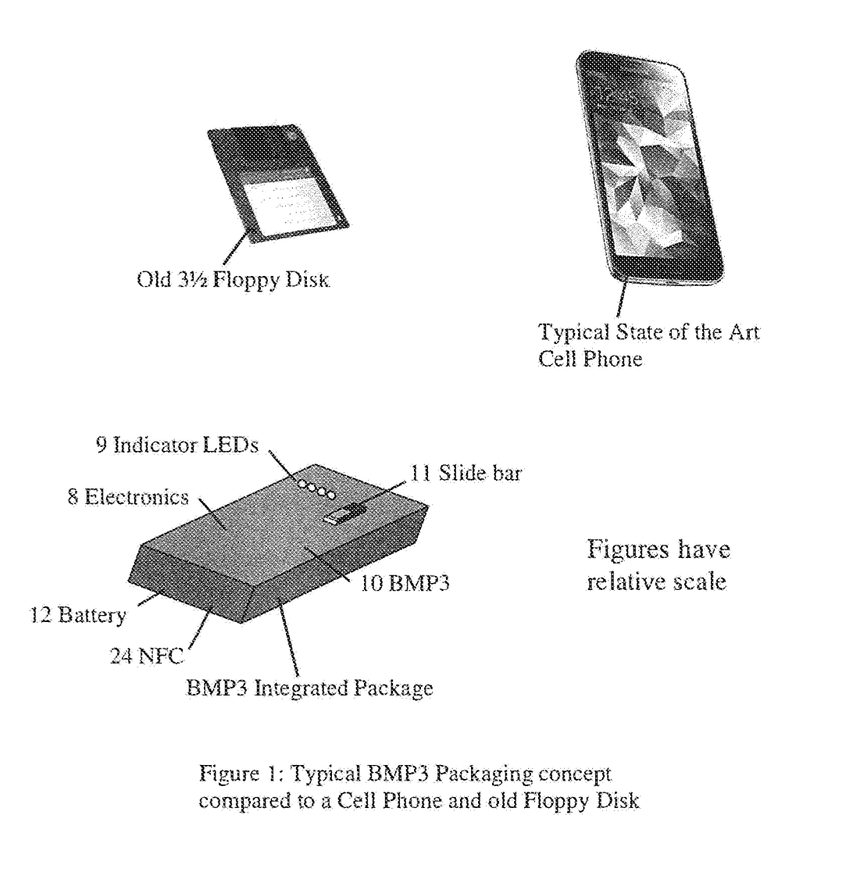
FIG. 1 illustrates a packaging concept of the BMP3 and compares it to package sizes of two familiar objects.

The preferred embodiment illustrated in FIG. 1 is a sealed module 10 containing a rechargeable Li-ion battery 12, top surface non-contact on-off switch 11, LEDs 9, charging NFC 24 and internal electronics 8. The electronics 8 functional block diagram, shown in detail in FIG. 3 comprises functional electronic blocks implemented using industry common electronic parts designed by any electronic engineer skilled in the art of electronic design. A hidden feature of the non-contact on-off slider switch 11 is the concealed magnet in contact with the BMP3 plastic case.

Figure 3:
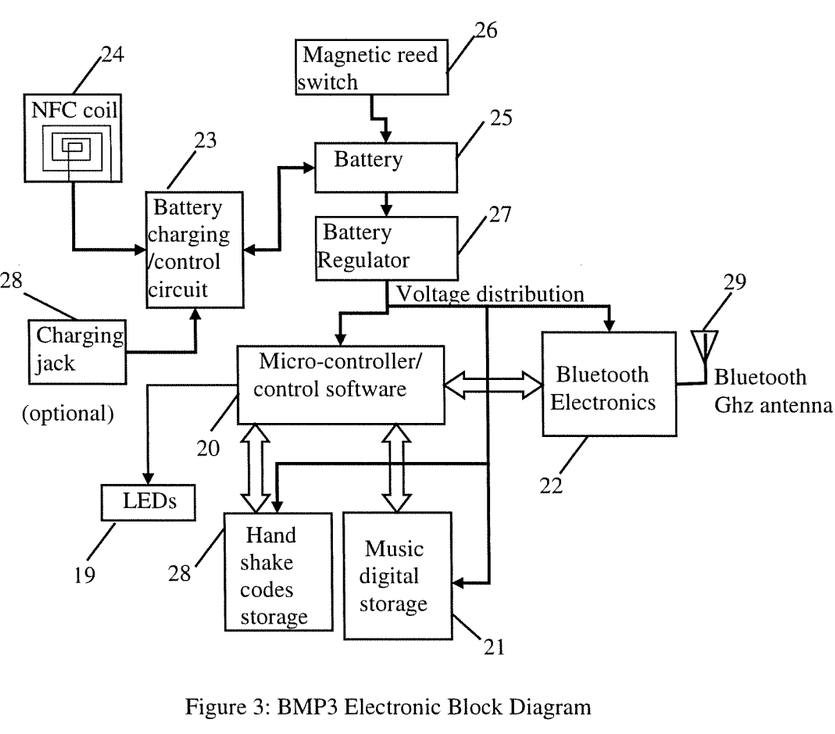
FIG. 3 illustrates an electronic block diagram of the BMP3 preferred embodiment.

The preferred embodiment uses the industry standard Near Field Communication (NFC) technique of implementing the battery charging current through magnetic coupling between an external NFC coil and internal BMP3 NFC coil 24. Alternatively but discouraged, the NFC approach may be eliminated and the battery charged through a simple standard jack 28. An obvious extension of these two battery charging concepts is to provide both. The NFC approach is preferred in order to retain the BMP3 sealed package but inclusion of the charging jack does not compromise the anti-pirating feature since it only connects to the battery through unidirectional diodes.

In this preferred embodiment the BMP3 unit includes a series of sealed tiny LEDs 9, 19 to indicate such things as mode of operation, battery usage, etc. As an example, these LEDs may present battery usage divided by quarters with the last LED caused to blink when the battery drain reaches 10%. Such an arrangement of LEDs and function is straight forward when controlled by a micro-controller. These tiny or micro-LEDs may take the form of individual LEDs, a 1× string of LEDs, a 2 dimensional LED matrix or an LED character display. A typical example of a single micro-LED is the SunLED part number XZM2CRKM2DG55 W-8 or XZMDK53 W-8. Four of these in a row would implement the battery depletion function described above. More elaborate user functions may be implemented by displaying alpha-numeric characters using, as an example a 4 digit 7-segment character display by Lumex part number LDQ-M516RI. There a literally hundreds of LED options with current technology.

Figure 4:
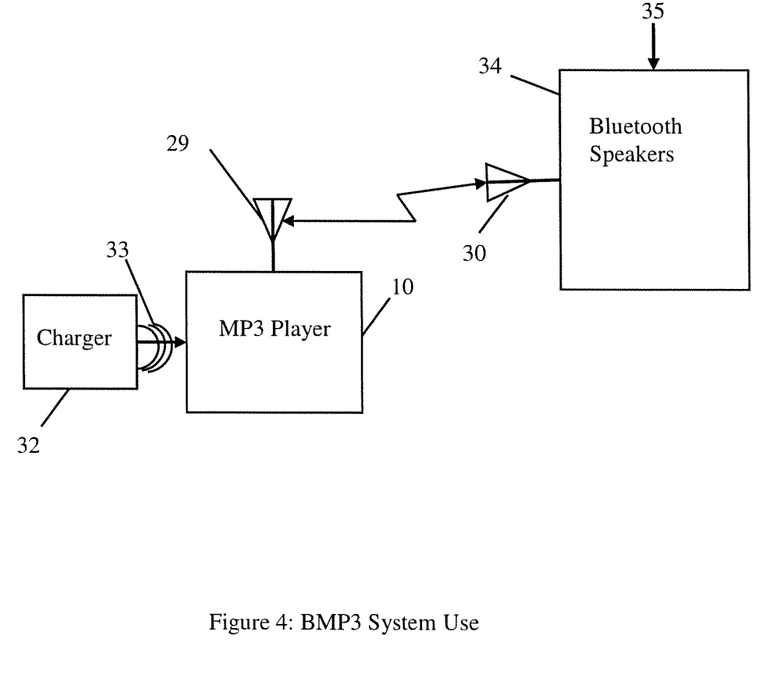
FIG. 4 illustrates the System Use of the BMP3 preferred embodiment.

In an embodiment illustrated in FIG. 3, the BMP3 Electronic Block Diagram contains the following standard or typical designs and key parts:

a. NFC coil 24 is discussed in a separate paragraph above. This coil part may be a commercially selected part such as the PulseLarsen Antennas W35xx or may be incorporated as part of the electronic designed PCB layout.

b. Battery charging control circuit 23 consists of standard electronic parts designed as a modified or programmable current driver to provide a specific battery high charging current degrading to a trickle charging current as the battery reaches 100% capacity.

c. Magnetic reed switch 26 is a specialty part such as the Littlefuse Inc part number 59170-1-U-00-D, which is a sealed dry contact switch that is made when a magnetic is placed in close proximity to the switch package.

d. Battery 25 typically a Lithium-ion rechargeable battery sized to provide the desired BMP3 operating time.

e. Battery regulator 27 consists of standard electronic parts designed to provide a fixed output voltage independent of battery voltage. As the battery degrades in capacity its voltage will degrade and the battery regulator will ensure the electronics are protected from this voltage degradation. The battery regulator may implement the function of a high efficiency buck converter or similar electronic scheme all of which are within the realm of standard practice for an experienced electronic engineer.

f. LED 19 as discussed in a separate paragraph above.

g. Micro-controller 20 containing special BMP3 developed software controls the BMP3 operation, except the battery 23, battery regulator 25 and charging/control circuit 27. The detailed functions performed by the micro-controller are discussed later. There are many micro-controllers or computer chips to choose from in the industry. For example, the Microchip Company has an extensive family of microchip controllers exhibiting various distinct features of I/O, #bits, on board memory capacity, flash memory, extent of instruction set, low power, etc. One example of such a device is the PIC 16F15324.

h. Handshake codes storage 28 is a set of EEPROMs to store these codes. This set of EEPROMs is shown as a separate chip set but may in fact be integrated into the micro-controller 20 depending on how much internal storage the selected micro-controller 20 has beyond what is required to store the BMP3 software.

i. Music digital storage 21 is a set of EEPROMs to store the collection of music tracks. If the BMP3 is marketed as a single use device this storage may be implemented using EPROMs or PROMs. The amount of storage required or number of chips depends on the desired music capacity of the BMP3. Each music track requires 3-5 MB of storage.

j. Bluetooth Electronics 22 is a specialty chip or chipset. The current technology uses the Bluetooth v4.1 specification, but v4.2 is emerging so the best "standard" chip set will undoubtedly change in the near future. Based on specific anti-pirating features discussed herein one aspect of the invention uses proprietary or nonstandard firmware programmed into standard chips such as the Nordic Semiconductor nRF51822 chip, or equivalent, and used in both the BMP3 and Bluetooth speaker unit 34. The Bluetooth function in the BMP3 is discussed in a separate paragraph immediately below.

k. Bluetooth Ghz antenna 29 is a specialty device coupled to the Bluetooth Electronics 22. Which antenna is used depends on the Bluetooth frequency band selected. An antenna example is the dual band Johanson Technology, Inc., part number 0900AD47A2450.

In this preferred embodiment communication of music content uses a Bluetooth protocol 22 to deliver music to external speakers. This approach eliminates the possibility that any external computer device could access the BMP3 computer 20 and thereby access the music digital storage 21, since there is no direct wiring. And in addition, the Bluetooth electronics together with the BMP3 computer are designed to allow only unidirectional transfer of music content while still allowing the usual "handshake" protocol with a remote Bluetooth capable device which interfaces with speakers. A "handshake" is an industry standard term meaning connecting or pairing two compatible Bluetooth enabled devices.

This key feature of the BMP3 computer/Bluetooth protocol to limit two-way communication between the external paired Bluetooth device and the BMP3 includes but is not limited to the following BMP3 outputs:

a. BMP3 model, serial number and warranty information b. Stored music track title information to include the typical track number, title, artist, etc.

c. List of all stored music titles.

d. Selected single music track digital stream.

e. Digital stream of all music tracks in order.

f. Digital stream of random music tracks.

g. Preprogrammed validated handshake codes.

h. Usage time/battery time.

Accepted BMP3 Bluetooth transmission requests by the paired Bluetooth device are limited to the factory set and preprogrammed validated handshake codes or by authorized updates to this set of handshake codes.

Another key feature of the preferred embodiment, controlled by the imbedded BMP3 software 20, following receipt of a valid Bluetooth code from the pairing device is to store handshake code, date and time stamp. This paired and validated hand shake between the BMP3 and external paired Bluetooth device adds a further layer of protection by creating an auditable trail if needed for future investigation.

Another key feature of a preferred embodiment, controlled by the imbedded BMP3 software 20, is to control post manufacture and post purchase updates to a Bluetooth pairing code by allowing code updates through a connection to a special Web site with the connection being made through the desired Bluetooth connection coupled to cell phone, tablet, computer, etc.

The micro-controller 20 operation performs the following functions, as a minimum:
 a. Startup reset when battery power is detected.
 b. Monitor Bluetooth communication to detect a handshake request.
 c. Control pairing communication through the Bluetooth circuitry.
 d. Transfers valid pairing handshake information to the pairing memory storage.
 e. Temporarily registers the requested operating condition, example: random streaming of music tracks.
 f. Provides requested music/device information, examples: library music selections and battery usage.
 g. Channels the requested music as a digital stream from BMP3 digital storage to the Bluetooth transmitting output power stage, adding a high frequency RF modulated digital tag before each music track.

The high frequency RF digital tag identified above is one more layer of built-in anti-pirating security. The use of this digital tag is an option when the Bluetooth filter approach is used but it is mandatory when the standard Bluetooth protocol is used. This tag allows the identification of the track origin and due to the tag's high frequency is typically beyond a speaker's frequency response and is therefore not heard by the user. If there is any residual hissing sound caused by the imbedded high frequency digital tag this can be eliminated by use of a purpose built Butterworth filter as one example, either passive or active, imbedded in the speaker unit. Or alternatively, the high frequency RF digital tag may be specifically designed to interfere with audio quality requiring the inclusion of a Butterworth or equivalent filter in the speaker unit.

In a more sophisticated approach to imbedding a high frequency RF digital tag in the Bluetooth audio output is to further encode the audio stream with either an analog or digital carrier which must be synchronously stripped out by purpose built circuitry in the audio speaker unit. This circuitry would use synchronous coding generated by the BMP3 computer and output by the BMP3 Bluetooth along with the audio stream.

Another preferred approach to adding a layer of built-in anti-pirating security is to indirectly encode the audio output stream from the BMP3 Bluetooth by implementing a non-standard Bluetooth handshake protocol so that only a matching Bluetooth unit will pair correctly. This approach may be termed a Bluetooth filter as mentioned above.

Another approach is to design the BMP3 with dual Bluetooth connectivity, as follows:
 a. Pair with a proprietary Bluetooth protocol labeled here as the Bluetooth filter. This would require a companion speaker unit having the compatible Bluetooth filter. For this type of pairing the audio would not need any special imbedded RF tag discussed above, but this could be an option in order to layer the anti-pirating features.
 b. Pair with a standard Bluetooth protocol. This would make the BMP3 compatible with all commercial products having a Bluetooth pairing capability. But for this case the audio would have imbedded in it an RF tag which would be designed to distort the audio when recorded or played back. This would require a purpose built filter to be imbedded in the audio speaker channel to remove the music audio distortion.
 c. Pair as in b) above but avoid the audio distortion with the imbedded RF tag and instead require an audible trail of connectivity which would be stored in the BMP3 memory and perhaps on a Web site and which would identify the Bluetooth device being paired in case needed for future litigation for pirating.

An embodiment of the BMP3 incorporates a rechargeable battery with battery charging through a NFC coil 24, or the less attractive and discouraged wired jack—28.

As FIG. 3 illustrates, the battery charging control circuitry 23 is separate from the micro-controller with the only connection being +V and −V power leads from the battery 25 through the battery regulator 27. Eliminating micro-controller control of the battery charging control circuitry eliminates the potential of an external NFC signal from accessing the control software.

If a charging jack 28 is provided, wiring shall only connect the jack to the charging circuit as illustrated in FIG. 3, item 23, through unidirectional diodes. This arrangement of connecting the BMP3 to a computer USB port precludes any communication with the BMP3 computer.

As FIG. 3 illustrates a BMP3 embodiment incorporates a magnetic reed switch 26 which turns the battery on and off. This switch is controlled by an external magnet slide bar 11 which slides in a BMP3 body slot 10 or molded channel. With this arrangement the BMP3 body remains sealed and again there is no control connection between the micro-controller and battery.

In an embodiment of the invention, the NFC technique may be altered to replace the Bluetooth Ghz transmission protocol herein described. This technique however, lacks NFC legal registration, potential bandwidth limitations and a further complication of not compromising the layered anti-pirating features inherent in the preferred BMP3 Bluetooth embodiment.

The preferred embodiment of the present invention packages the BMP3 in a small sealed block of suitable plastic 10. The size of this package is driven by the battery type, size and integration method. The battery size in turn is influenced by the battery type and desired BMP3 operating time. For example, the battery may take the form of a conventional cell phone rechargeable lithium-ion battery permanently imbedded in the BMP3 package. Or the lithium battery may be in a separate detachable package. Or the separate battery pack may contain conventional AA or AAA batteries. Any battery type or integration method may be used providing the BMP3 sealed integrity of the digital chip set and Bluetooth circuitry is maintained.

The battery pack may be single use or rechargeable. If rechargeable, the battery may be charged by the preferred NFC magnetic coil 24, or through a standard AC-DC converter or solar cell DC voltage connected to the optional charging jack 28.

An embodiment the BMP3 should not have an external audio jack, or line jack—a line jack differs from audio jack in analog level only—for this could weaken or compromise the multi-layer levels of anti-pirating features. If an external audio jack is preferred the BMP3 audio output should incorporate a high frequency RF digital tag or other industry standard modulation scheme requiring purpose built circuitry in the separate audio speaker unit.

In a further embodiment of the BMP3 concept to enhance inhibiting of unauthorized reproduction or pirating of stored music the sealed BMP3 package may contain a hidden destruction feature which would render the digital storage media unreadable if the BMP3 package is cut open. This destruction feature may be as simple as conductive foil layers which will apply a reverse voltage to a % of the digital memory cells. And still another approach, breaking the BMP3 package open would cause closely spaced wires to short apply a reverse voltage to a % of the digital memory cells.

In another embodiment of the present invention the BMP3 may incorporate a time counter to keep track of BMP3 usage time. This time counter may be advantageously used in a lease/rental marketing strategy to terminate use or for general user information.

Figure 2:
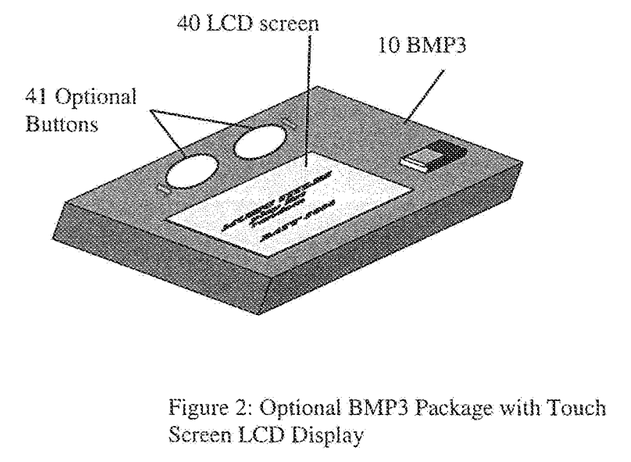
FIG. 2 illustrates an LCD screen added to the BMP3 preferred embodiment.

In another embodiment of the present invention the BMP3 may incorporate an imbedded LCD (or equivalent) screen 40 by which device information such as battery use may be provide and through which the user may communicate operating preferences. Communicating with the LCD screen may be done directly if it is a touch screen or indirectly by providing one or more sealed surface mount buttons 41 beside the screen. Providing an LCD screen has a significant advantage when using simple wireless headsets like the Plantronics BackBeat Go with only a Bluetooth connection capability. One example of a simple graphic LCD Display is the 1.5" Nokia 5110/3310 monochrome LCD.

In another embodiment of the present invention the BMP3 may incorporate voice reporting/information to the user as opposed to providing user information that must be read from an external LCD screen, imbedded LCD screen 40 or monitored by LEDs 9.

In another embodiment of the present invention the BMP3 may have built-in or imbedded advertisements either conveyed by voice or read on an external LCD screen or imbedded LCD screen 40.

The BMP3 may be marketed as non-programmable which means the digital tracks can never be altered or changed.

In a further embodiment of the present invention a BMP3 model may incorporate a capability to allow one-time or multiple uploading of music and library data from a commercial music store or music supply enterprise. This capability expands the potential for increased sales by introducing the consumer to ordering personalized music selections preloaded on the BMP3 device during purchase. This secured purchasing arrangement is new to the industry and not available without the invention of the herein described BMP3. In addition and most important this type of purchase preserves the anti-pirating features inherent in the BMP3.

The BMP3 may be marketed as single purchase or as a lease/rental.

As a further expansion of the marketing concept outlined above the BMP3 may be marketed as a reprogrammable model but with two restrictions in order to maintain the enhanced anti-pirating features. These restrictions are:
 a. Reprogramming dumps all stored digital memory data without the possibility of readout.
 b. Inputting new music track/library data will only be accepted by the BMP3 from authenticated music sources.

The preferred embodiment of BMP3 system use, illustrated in FIG. 4, consists of 3 major parts: the BMP3 player 10, charger 32 with magnetic coupling 33 and Bluetooth speakers 34 with power source 35. The Bluetooth antennas 29 and 30 are internal in both the devices 10 and 34 but are shown externally here only for clarity. The Bluetooth speakers 34 may be any suitable speakers unit, either mono or stereo, such as but not limited to vehicle speakers, boom box, head set or public address system. The compatibility of a particular Bluetooth speaker will be based on the decision to use standard Bluetooth chip firmware relying on device serial number reporting and archiving or proprietary nonstandard Bluetooth firmware. The Bluetooth Speakers unit may be divided into two parts—a Bluetooth unit and power amplifier/speakers unit.

Figure 5:
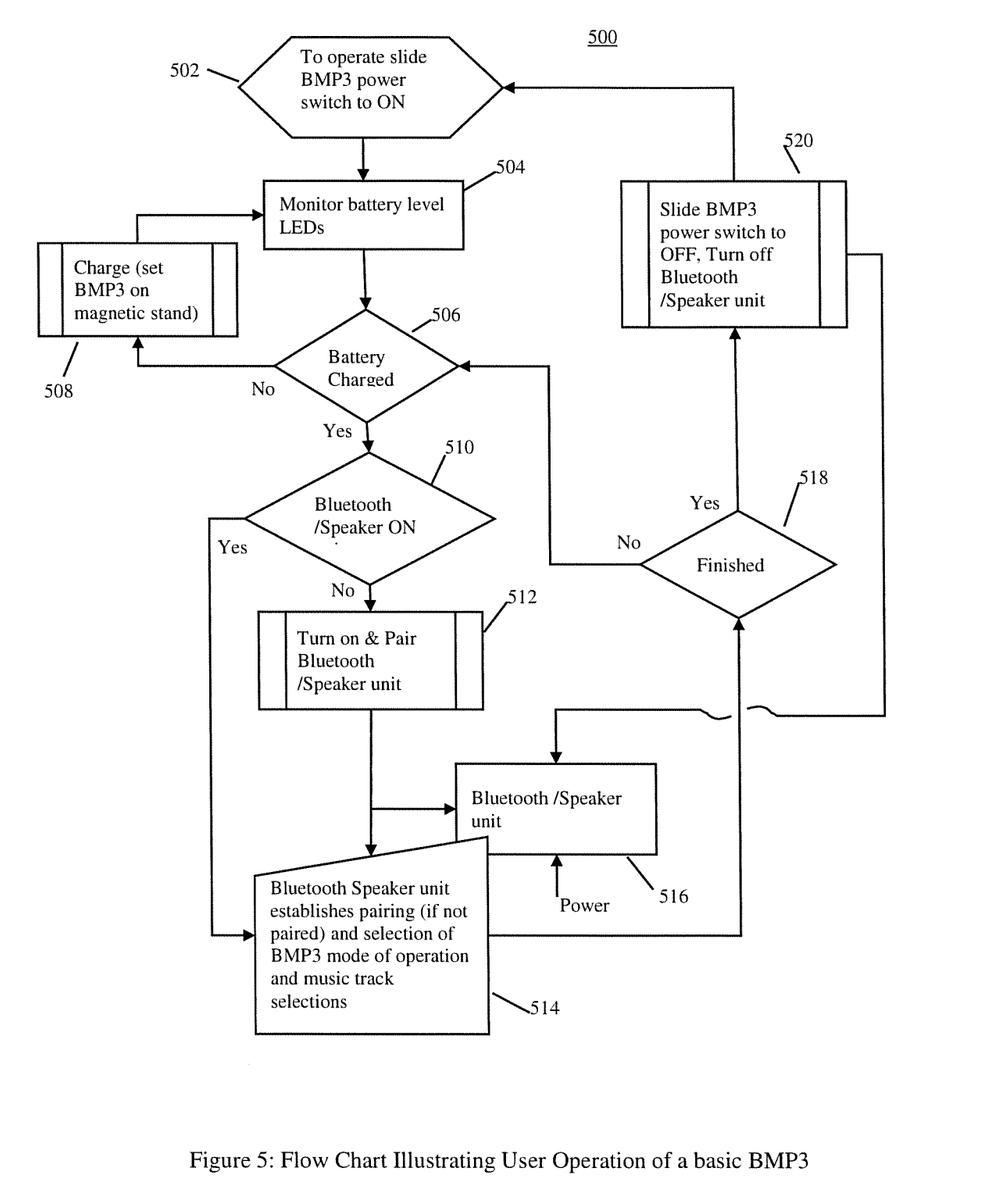
FIG. 5 is a flow chart illustrating User Operation of the BMP3 preferred embodiment of a basic BMP3.

User operation of the basic BMP3 10 is illustrated in the flow chart of FIG. 5. This flow chart is based on the set of LEDs for battery status and the Bluetooth Speaker unit to establish pairing and communicate mode of operation and playback music tracks to the BMP3 unit. Many variations of this basic BMP3 unit are possible by adding more LED functions and a button to cycle through modes of operation.

In basic operation 500, the BPM3 power switch is moved to the "ON" position 502. The BMP3 may then be monitored for battery level 504. If the battery is not fully charged 506, it may be charged by setting the BMP3 on its magnetic charger 508. Next, the BMP3 enters its default duty loop. If the BMP3 is not on 510, it can be turned on and attempt to pair with a Bluetooth speaker system 512. Upon establishing pairing the BMP3 enters its music track selection mode of operation 514. The music track is then played on the paired Bluetooth speaker unit 516. Upon completion 518, the BMP3 power switch is set to the "OFF" position 520.

Figure 6:
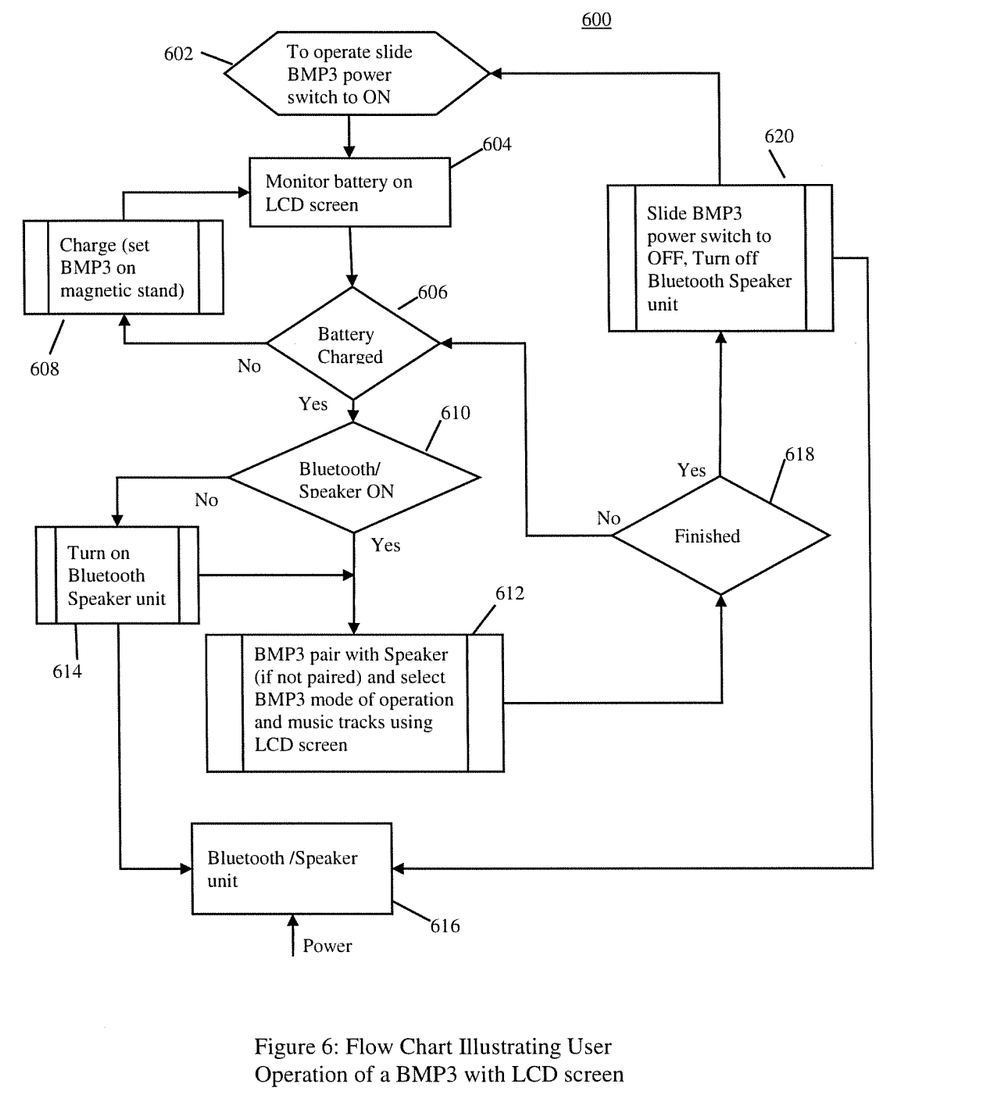
FIG. 6 is a flow chart illustrating User Operation of the BMP3 preferred embodiment with an imbedded LCD screen.

User operation of the BMP3 unit containing an LCD screen 40 is illustrated in the flow chart of FIG. 6. This flow chart is based on the LCD screen providing battery status and the user/operator setting all operating modes and music playback selections through appropriate LCD screen menus. In addition the BMP3 LCD screen is used to establish pairing with the Bluetooth Speaker unit. Like the flow chart of FIG. 5, the Bluetooth Speaker unit may also establish the pairing if this unit has this independent capability.

In basic operation using an LCD screen 600, the BPM3 power switch is moved to the "ON" position 602. The BMP3 LEDs may then be monitored for battery level 604. If the battery is not fully charged 606, it may be charged by setting the BMP3 on its magnetic charger 608. Next, the BMP3 enters its default duty loop. If the BMP3 is not on 610, it can be turned on and attempt to pair with a Bluetooth speaker system 614. Upon establishing pairing, the BMP3 enters its music track selection mode of operation 612. The music track is then played on the paired Bluetooth speaker unit 616. Upon completion 618, the BMP3 power switch is set to the "OFF" position 620.

Summary matrix of BMP3 Anti-pirating features

| # | Label | Brief Description | Requirements for use | Limitations |
|---|---|---|---|---|
| 1 | BMP3 Bluetooth Filter | Proprietary Bluetooth communication protocol | BMP3 compatible with Bluetooth speaker unit | BMP3 only works with compatible Bluetooth speaker unit |
| 2 | BMP3 Standard Bluetooth | Standard Bluetooth communication protocol | 1) Standard Bluetooth device 2) Purpose built filter in speakers for quality sound | Quality sound with special filter in audio speaker channels |
| 3 | BMP3 Dual Bluetooth | Combining #1 and #2 | Combining #1 and #2 and adding 3$^{rd}$ option | Combining #1 and #2 as above and |

| # | Label | Brief Description | Requirements for use | Limitations |
|---|---|---|---|---|
| | | | to avoid audio filter by registering connectivity device | restricting 3$^{rd}$ option if not registered properly |
| 4 | Sealed BMP3 unit | Sealed unit preventing wired electronic transfer of contents | n/a | n/a |
| 5 | RF modulated digital tag | Added feature to #1 as option and #2 | Same as #1 and #2 | Same as #1 and #2 |
| 6 | Destructive feature | Renders digital storage unreadable when BMP3 package opened | n/a | n/a |

As a further expansion of the BMP3 concept the design in its various forms may be expanded to allow video storage and playback. This requires the digital storage capacity to be significantly increased since a typical movie requires 4.7 GB of storage compared to a song track requiring 3-5 MB of storage. The cost of storing a video movie in a BMP3 memory chip set is estimated to be $2-$3. The anti-pirating layered features for music storage and playback also apply to video storage and playback. In addition the marketing advantages discussed above also apply to video.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A piracy-resistant music packaging and playback system comprising:
a micro-controller operatively connected to a battery regulator and battery and to Bluetooth electronics;
said Bluetooth electronics further operatively connected to a Bluetooth Ghz antenna and to said battery;
said battery further connected to a battery charging control circuit and operated by a magnetic reed switch;
said battery control circuit further operatively connected to a Near Field Communication (NFC) coil;
said micro-controller further comprising electronic storage for handshake codes and digital content storage, and said micro-controller further operatively connected to one or more light-emitting diodes (LEDs), said micro-controller, and electronic storage configured to:
upon movement of said reed switch to an "ON" position from a set of two positions, the "ON" position and an "OFF" position, said micro-controller attempts to pair with a Bluetooth device using said Bluetooth electronics, said Bluetooth Ghz antenna and said handshake codes, by applying a Bluetooth filter that restricts an attempt to pair from any Bluetooth devices not configured with said handshake codes; and
upon establishing pairing, said micro-controller sends digital content stored in the digital content storage to paired said Bluetooth device.

2. The piracy-resistant music packaging and playback system according to claim 1, wherein said NFC coil is replaced by a charging jack.

3. The piracy-resistant music packaging and playback system according to claim 1, wherein said digital content is digitized music.

4. The piracy-resistant music packaging and playback system according to claim 3, wherein said digital content comprises a plurality of digitized music tracks, and said sending of digital content to said paired Bluetooth device comprises sending said plurality of digitized music tracks one at a time.

5. The piracy-resistant music packaging and playback system according to claim 4, wherein said paired Bluetooth device is one or more speakers.

6. The piracy-resistant music packaging and playback system according to claim 4, wherein said micro-controller is further configured with anti-pirating software that screens said Bluetooth pairing with any external device to ensure authentication.

7. The piracy-resistant music packaging and playback system according to claim 6, further comprising updating of pairing codes by the micro-controller through Bluetooth electronics and an internet connection to a special web site.

8. The piracy-resistant music packaging and playback system according to claim 7, wherein said digital content comprises a digital watermark, said digital watermark being non-interfering with the digital content.

9. The piracy-resistant music packaging and playback system according to claim 1, wherein said digital content is digitized video.

10. The piracy-resistant music packaging and playback system according to claim 9, wherein said paired Bluetooth device is a television.

11. The piracy-resistant music packaging and playback system according to claim 1, wherein said micro-controller is further configured to insert an electronic tag into said digital content.

12. A piracy-resistant music packaging and playback method comprising:
pairing, by a micro-controller operatively connected to a battery regulator, battery and Bluetooth electronics, with a Bluetooth device using said Bluetooth electronics, a Bluetooth Ghz antenna and handshake codes, by applying a Bluetooth filter that restricts an attempt to pair from any Bluetooth devices not configured with said handshake codes; and,
sending, by said micro-controller, digital content to paired said Bluetooth device.

13. The piracy-resistant music packaging and playback method according to claim 12, wherein said digital content is digitized music.

14. The piracy-resistant music packaging and playback method according to claim 12, wherein said digital content is digitized video.

15. The piracy-resistant music packaging and playback method according to claim 12, wherein said paired Bluetooth device is one or more speakers.

16. The piracy-resistant music packaging and playback method according to claim 12, wherein said paired Bluetooth device is a television.

17. The piracy-resistant music packaging and playback method according to claim 12, wherein said micro-controller is further configured with anti-pirating software that screens said Bluetooth pairing with any external device to ensure authentication.

18. The piracy-resistant music packaging and playback method according to claim 17, further comprising updating of pairing codes by the micro-controller through Bluetooth electronics and an internet connection to a special web site.

19. The piracy-resistant music packaging and playback method according to claim 12, wherein said digital content comprises a digital watermark, said digital watermark being non-interfering with the digital content.

20. The piracy-resistant music packaging and playback method according to claim 12, further comprising inserting, by said micro-controller, an electronic tag into said digital content.

\* \* \* \* \*